Aug. 10, 1937.　　　　J. J. HARDY　　　　2,089,605
FISH LURE
Filed Nov. 5, 1936
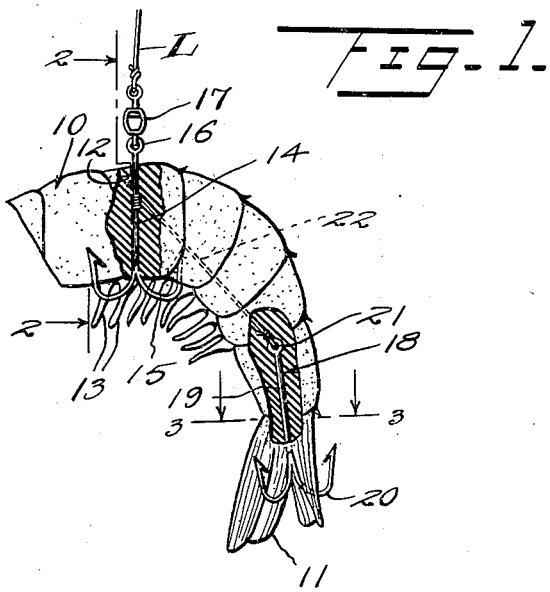
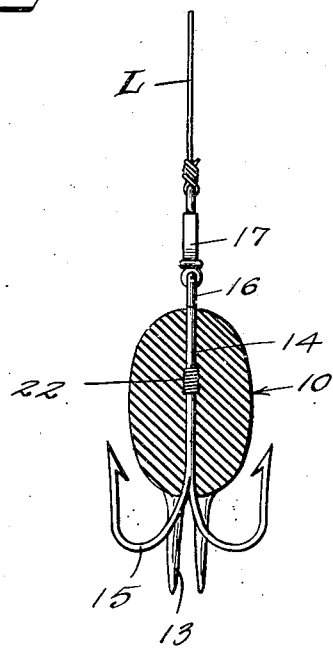
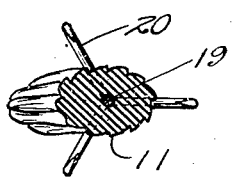
Inventor
J. J. Hardy
By Watson E. Coleman
Attorney Patented Aug. 10, 1937

2,089,605

UNITED STATES PATENT OFFICE 2,089,605

FISH LURE

John James Hardy, Fort Davis, Ala.

Application November 5, 1936, Serial No. 109,359

3 Claims. (Cl. 43—42)

This invention relates to fish lures and more particularly to a lure constructed in the form and simulation of a shrimp.

An object of this invention is to provide a fish lure simulating the tail portion of a shrimp which is provided with a plurality of hooks in the central and in the rear portion thereof, the lure being constructed of suitable non-absorbent material which will not be affected by water and which will not be damaged by a fish in grasping the lure.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a detailed side elevation partly broken away and in section of a fish lure constructed according to an embodiment of this invention;

Figure 2 is an enlarged sectional view taken on the line 2—2 of Figure 1;

Figure 3 is an enlarged sectional view taken on the line 3—3 of Figure 1.

Referring to the drawing the numeral 10 designates where the body of a lure constructed according to an embodiment of this invention and in the present instance this body 10 is constructed after the simulation of the rear or tail portion of a shrimp which is provided with a plurality of legs 13 extending downwardly from the body and with fins 11 projecting rearwardly thereof. This body 10 may be constructed of suitable material such as rubber, vulcanized cotton, felt or other material, and the outer surface of the body 10 is adapted to be colored or coated after the manner of the color of the natural shrimp so that when the body 10 is in the water it will resemble the rearward portion of the shrimp.

A hook structure generally designated as 12 is mounted in the body 10 substantially centrally thereof and this hook structure 12 comprises a shank 14 extending vertically through the body 10 and provided at its lower end with a pair of hook members 15 which are disposed one on each side of the body 10. The upper end of the shank 14 projects above the body 10 and is provided with an eye 16 to which a swivel 17 may be secured, and a fish line L may have one end secured to the swivel 17.

A second hook structure generally designated as 18 is carried by the body 10 and comprises shank 19 which is embedded in the body 10 and disposed longitudinally thereof. The rear end of the shank 19 is provided with a plurality of hook members 20 and in the present instance there are three of these hook members 20 which project laterally of each side of the body 10 at the rear thereof and one of the hook members 20 projects downwardly below the body 10. The eye 21 of the shank 19 is connected by means of a wire 22 to the shank 14 of the hook member 12 at a point substantially central of the body 10 and of the length of the shank 14. In this manner, in the event a fish is caught on the hook structure 18 the strain of the pulling of the fish will be borne by the transverse hook 12.

In the use of this lure the device is attached to one end of the line L and then cast into water. The fish may be caught on either the forward hook structure 12 or may be caught on the rear hook structure 18. In the event the fish is caught on the hook structure 18 the strain will be communicated to the hook 12 and then to the line L through the connecting member 22.

I claim:

1. A fish lure comprising a relatively solid body portion, having a configuration and color to simulate the tail portion of a natural shrimp, dependant legs carried by the body, fins carried by the rear portion of the body, a multiple hook member having the barbs thereof projecting laterally and downwardly of said fins, said hook member having the shank and eye thereof embedded in the body and disposed longitudinally thereof, a second multiple hook positioned between the ends of the body, said second hook member having the barbs thereof disposed on opposite sides of the body, the shank of said second hook member extending through said body at substantially right angles to the shank of said first hook member and terminating in an eye exteriorly of the body, and means embedded in the body connecting the eye of said first hook member to the shank of said second hook member.

2. A fish lure comprising a body simulating a tail portion of a natural shrimp, a multiple hook member having the shank thereof extending transversely across the body, the barbs of the hook member being disposed one on each side of the body and the eye of the hook member being disposed on the upper side of the body, a second hook member having the shank thereof embedded in said body and disposed longitudinally thereof, and means connecting said second hook member to said first hook member.

3. A fish lure comprising a body having the configuration and color of a natural shrimp from the beginning of the tail portion to the rear thereof, a double barbed hook extending vertically through the body with the barbs disposed one on each side thereof and with the eye of the hook structure disposed above the top of the body, a triple hook structure having the shank thereof embedded in the body and the barbs thereof disposed at the rear of the body, and connecting means connecting the eye of the triple hook structure with the shank of the double hook structure interiorly of the body.

JOHN JAMES HARDY.